June 23, 1942. C. G. HAWLEY 2,287,427
SYSTEM OF WATER PURIFICATION AND WASTE DISPOSAL
Filed Jan. 15, 1937 11 Sheets-Sheet 1
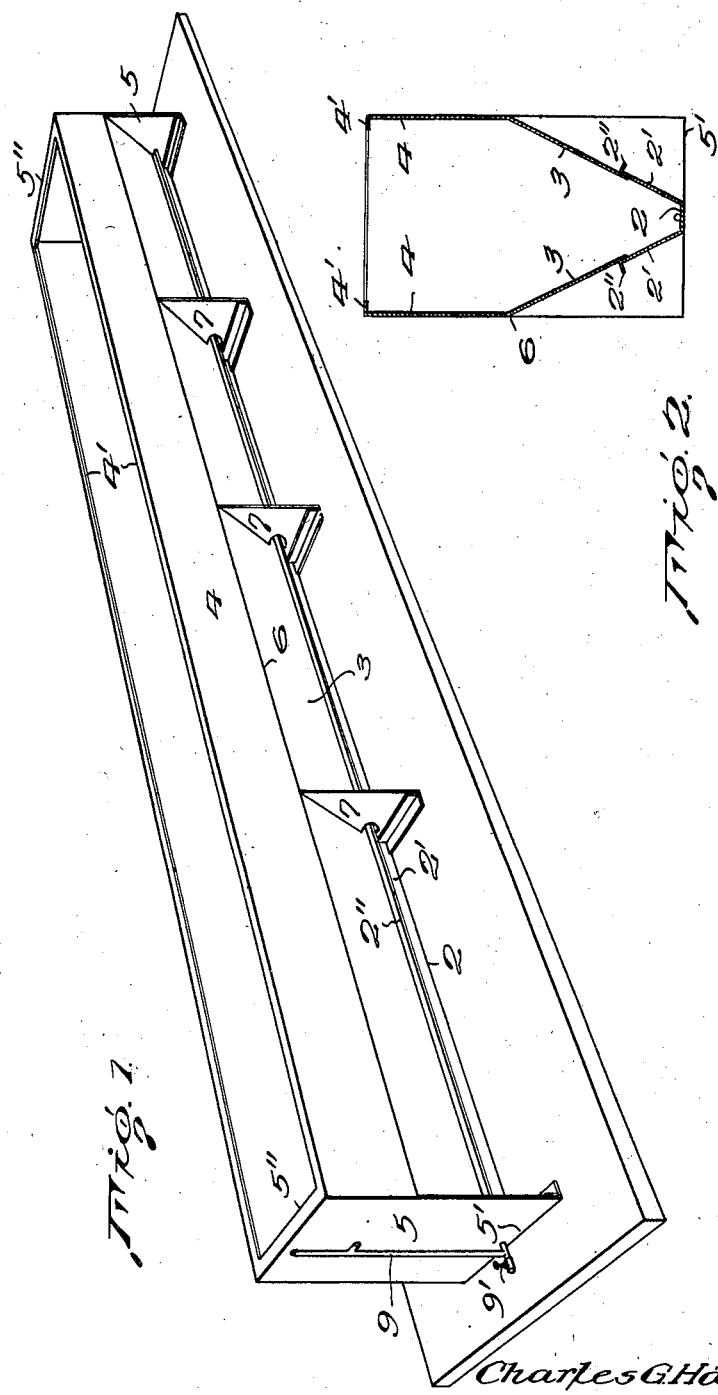
Inventor
Charles G. Hawley,
by Burse & Hardy
Attorneys

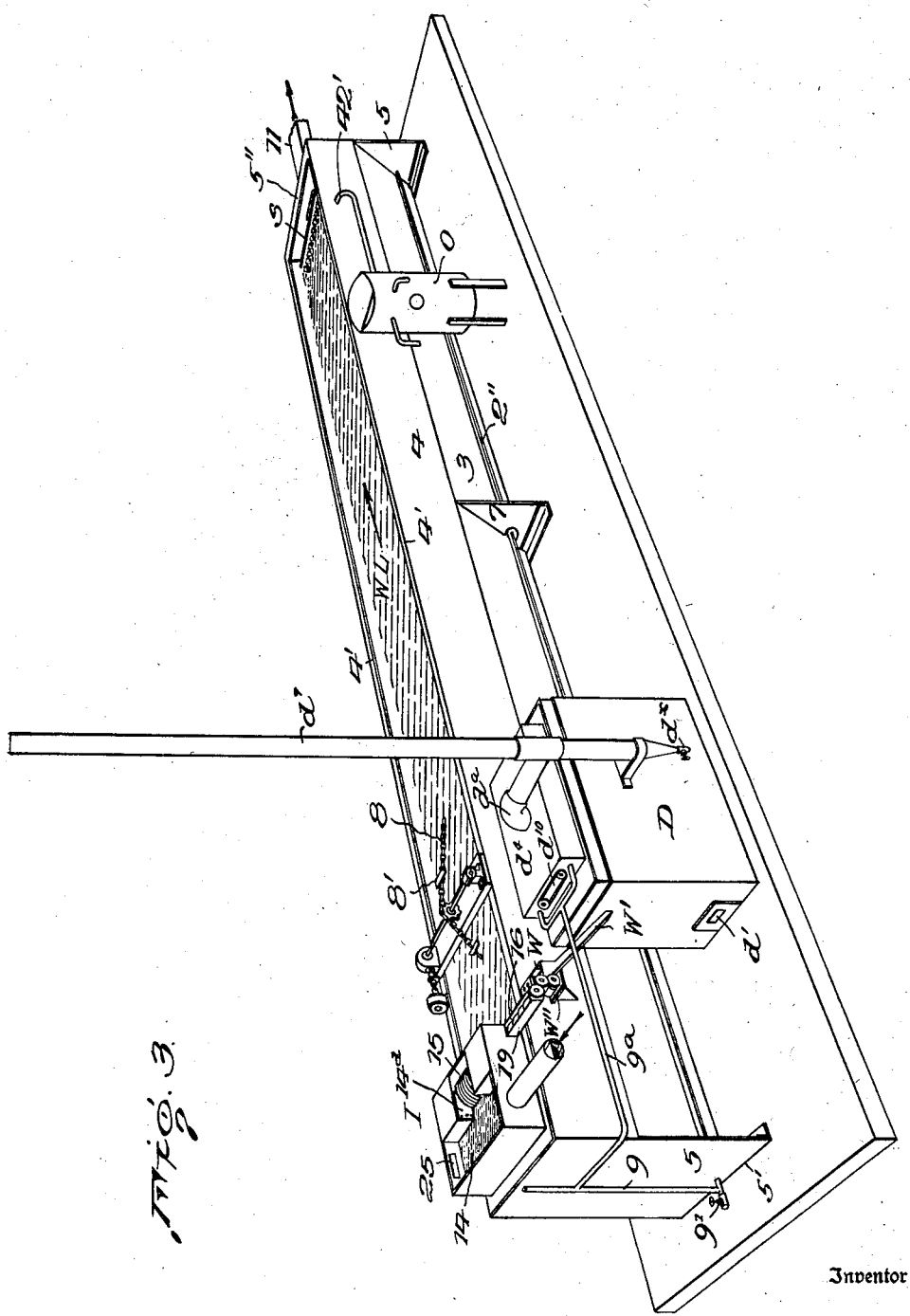

June 23, 1942.  C. G. HAWLEY  2,287,427
SYSTEM OF WATER PURIFICATION AND WASTE DISPOSAL
Filed Jan. 15, 1937   11 Sheets-Sheet 3
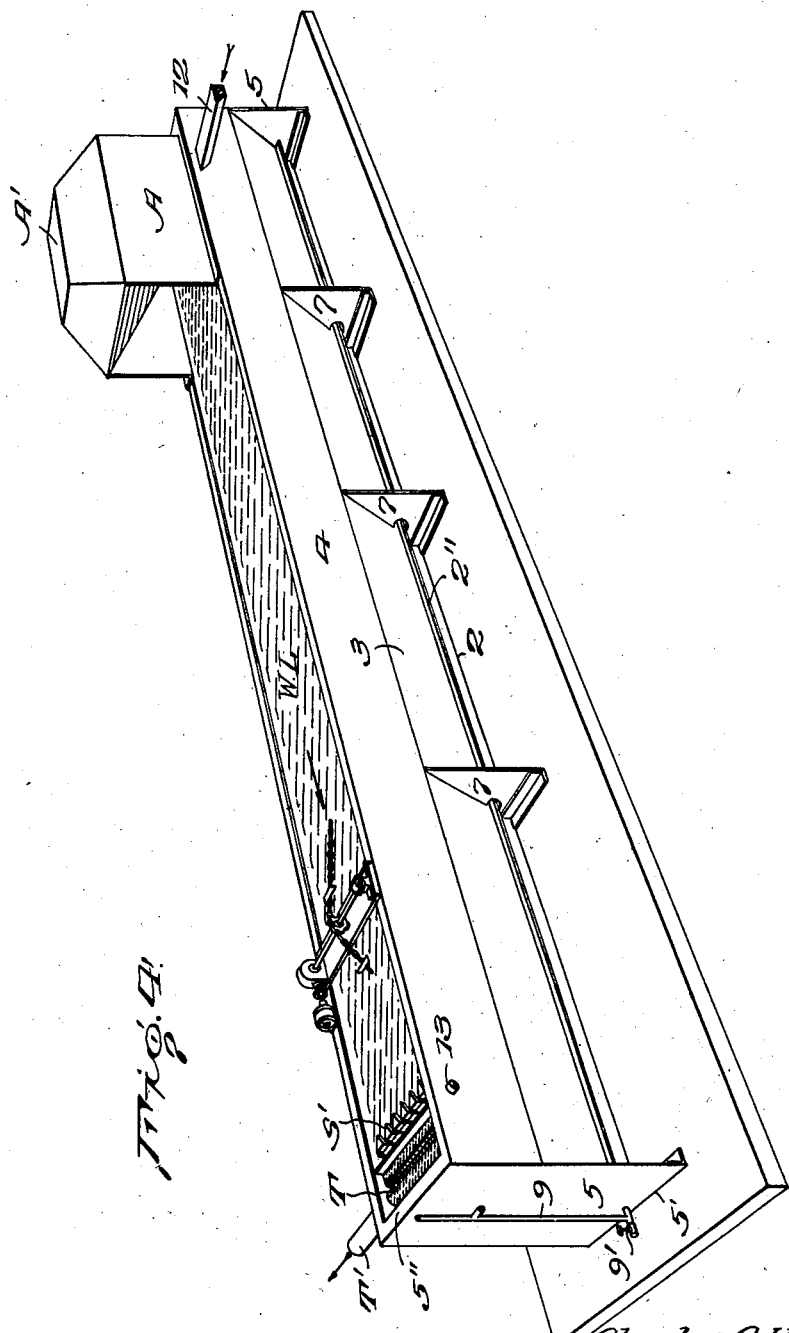
Inventor
Charles G. Hawley,
by Busser & Harding
Attorneys.

June 23, 1942. C. G. HAWLEY 2,287,427
SYSTEM OF WATER PURIFICATION AND WASTE DISPOSAL
Filed Jan. 15, 1937 11 Sheets-Sheet 4
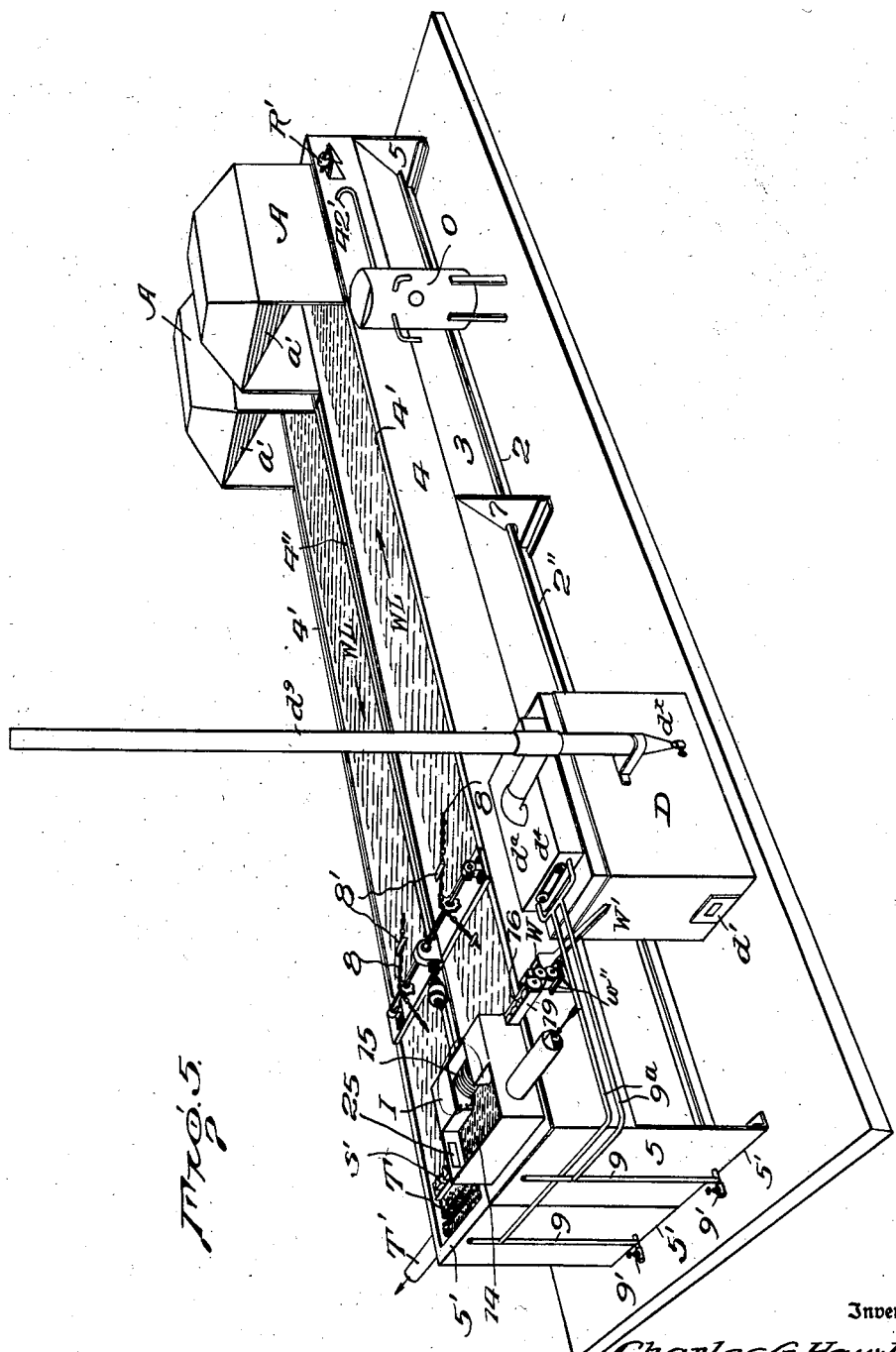
Inventor
Charles G. Hawley,
by Burman & Harding
Attorneys June 23, 1942. C. G. HAWLEY 2,287,427
SYSTEM OF WATER PURIFICATION AND WASTE DISPOSAL
Filed Jan. 15, 1937 11 Sheets-Sheet 5
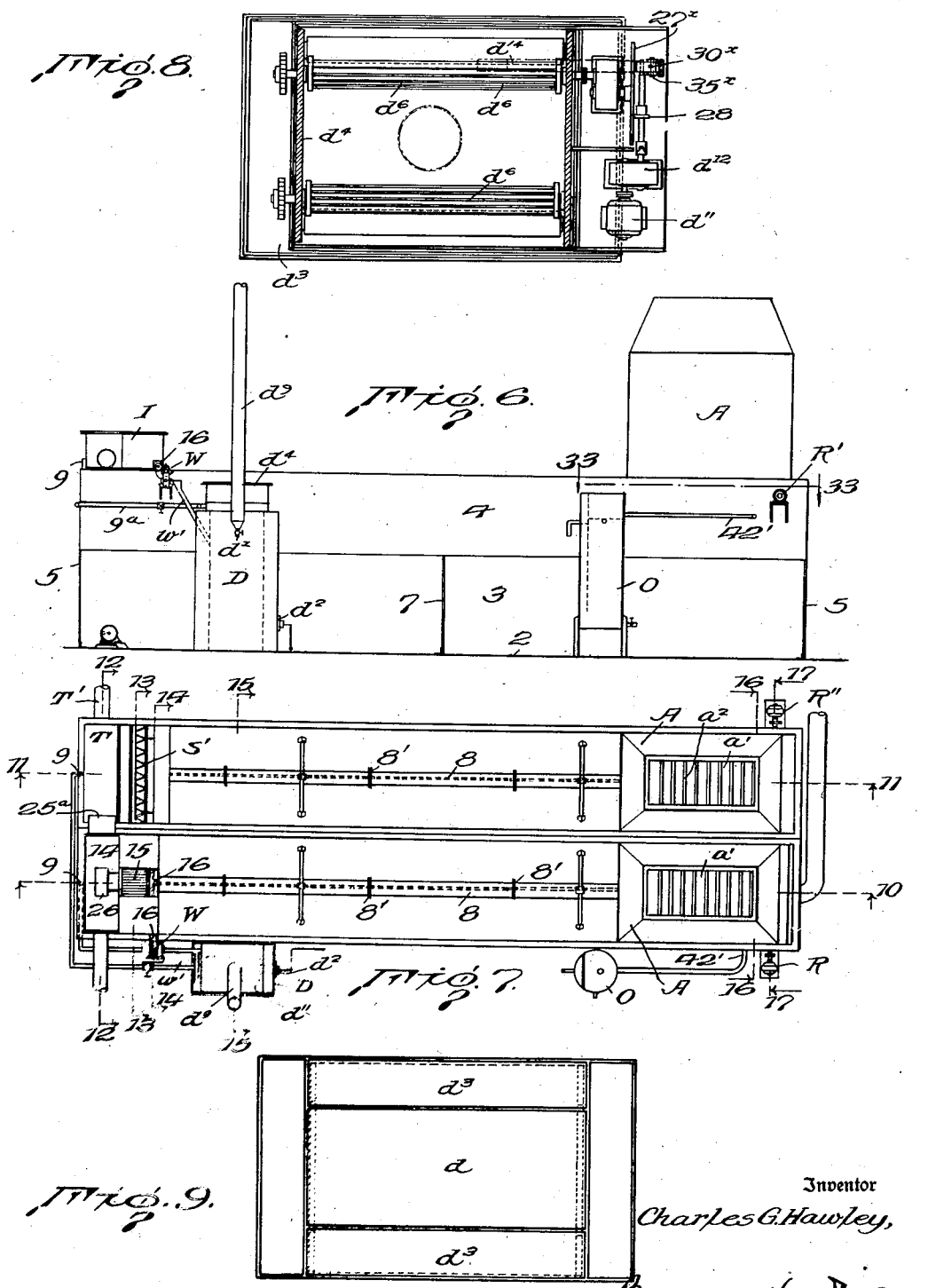
Inventor
Charles G. Hawley,
by Busser v Harding
Attorneys June 23, 1942.   C. G. HAWLEY   2,287,427
SYSTEM OF WATER PURIFICATION AND WASTE DISPOSAL
Filed Jan. 15, 1937   11 Sheets-Sheet 6
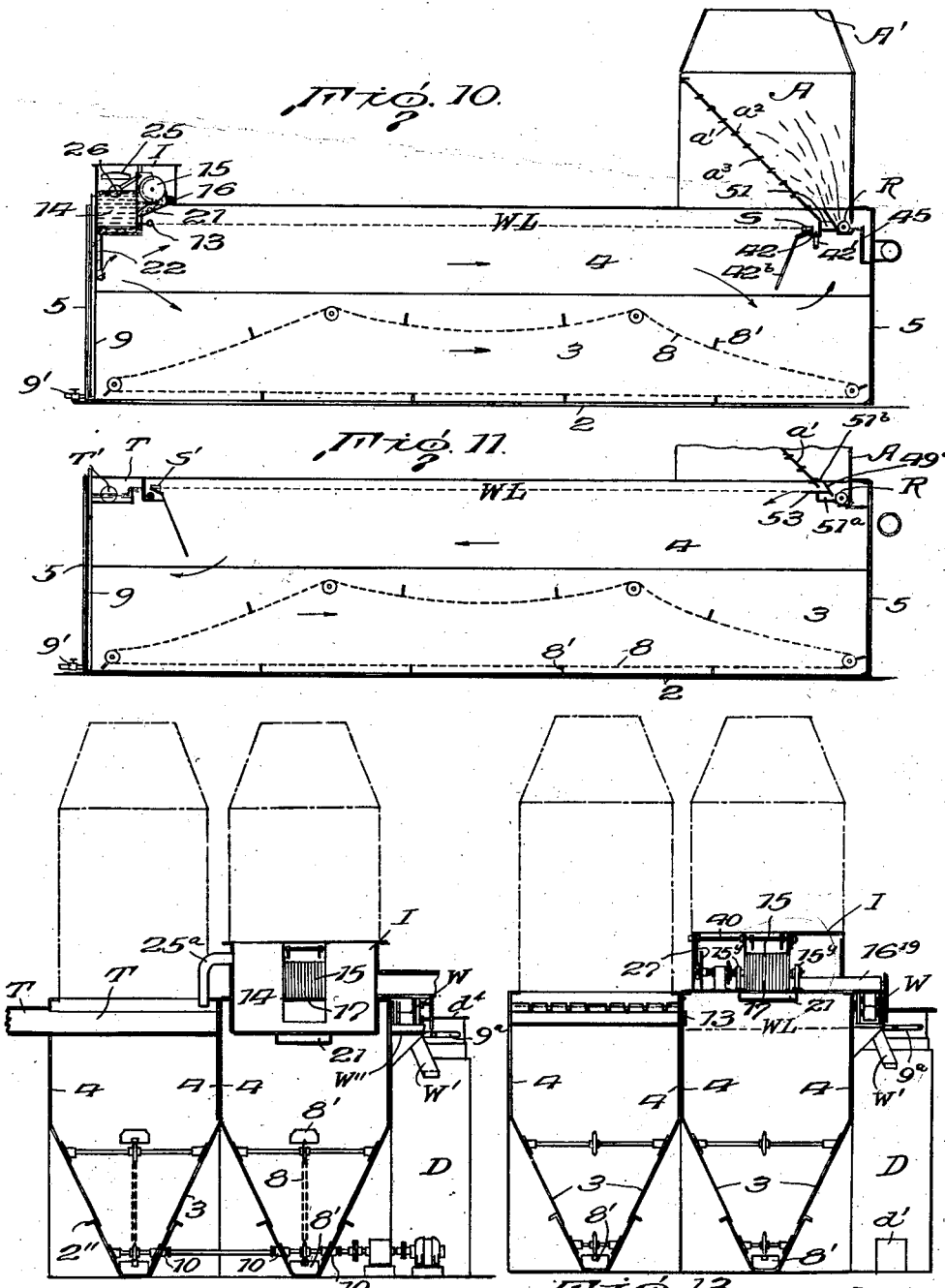

June 23, 1942. C. G. HAWLEY 2,287,427
SYSTEM OF WATER PURIFICATION AND WASTE DISPOSAL
Filed Jan. 15, 1937 11 Sheets-Sheet 7
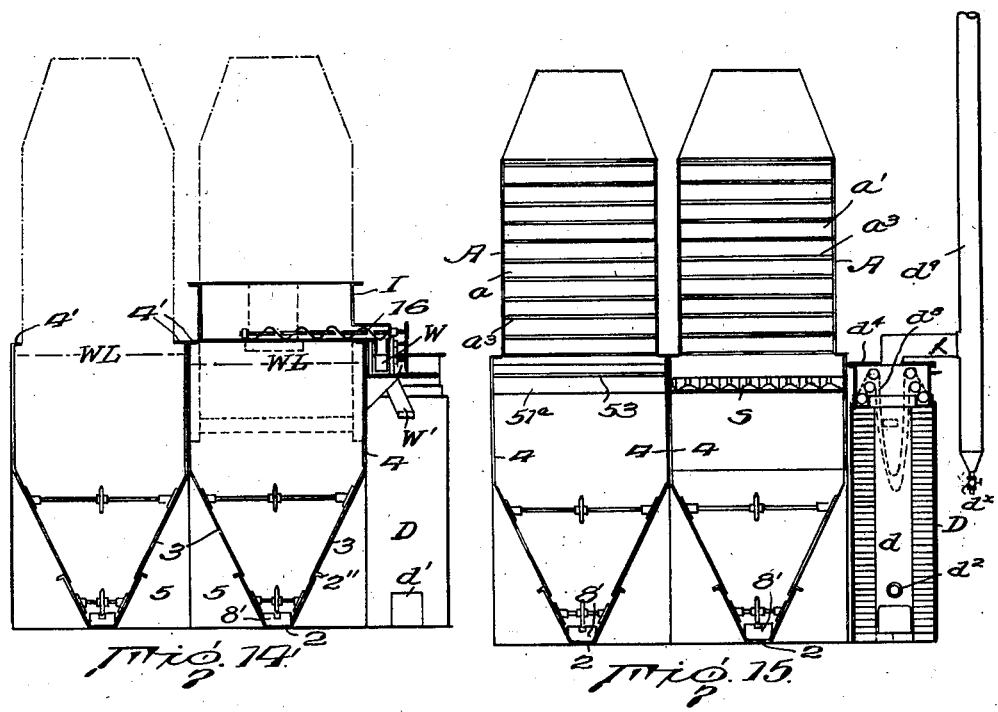
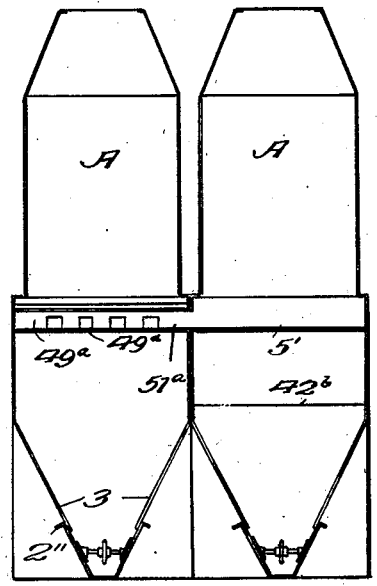
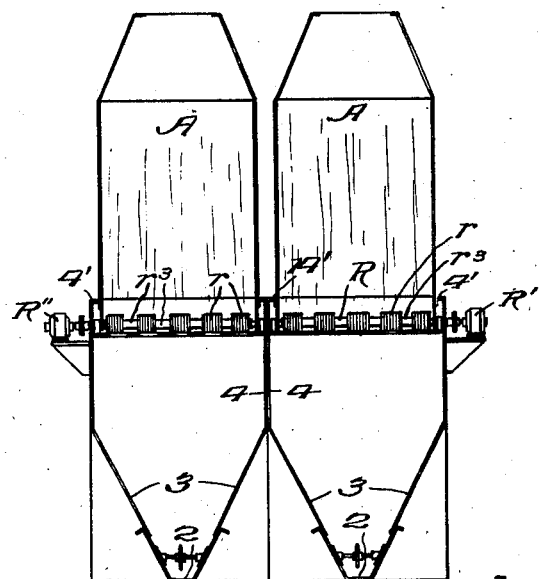

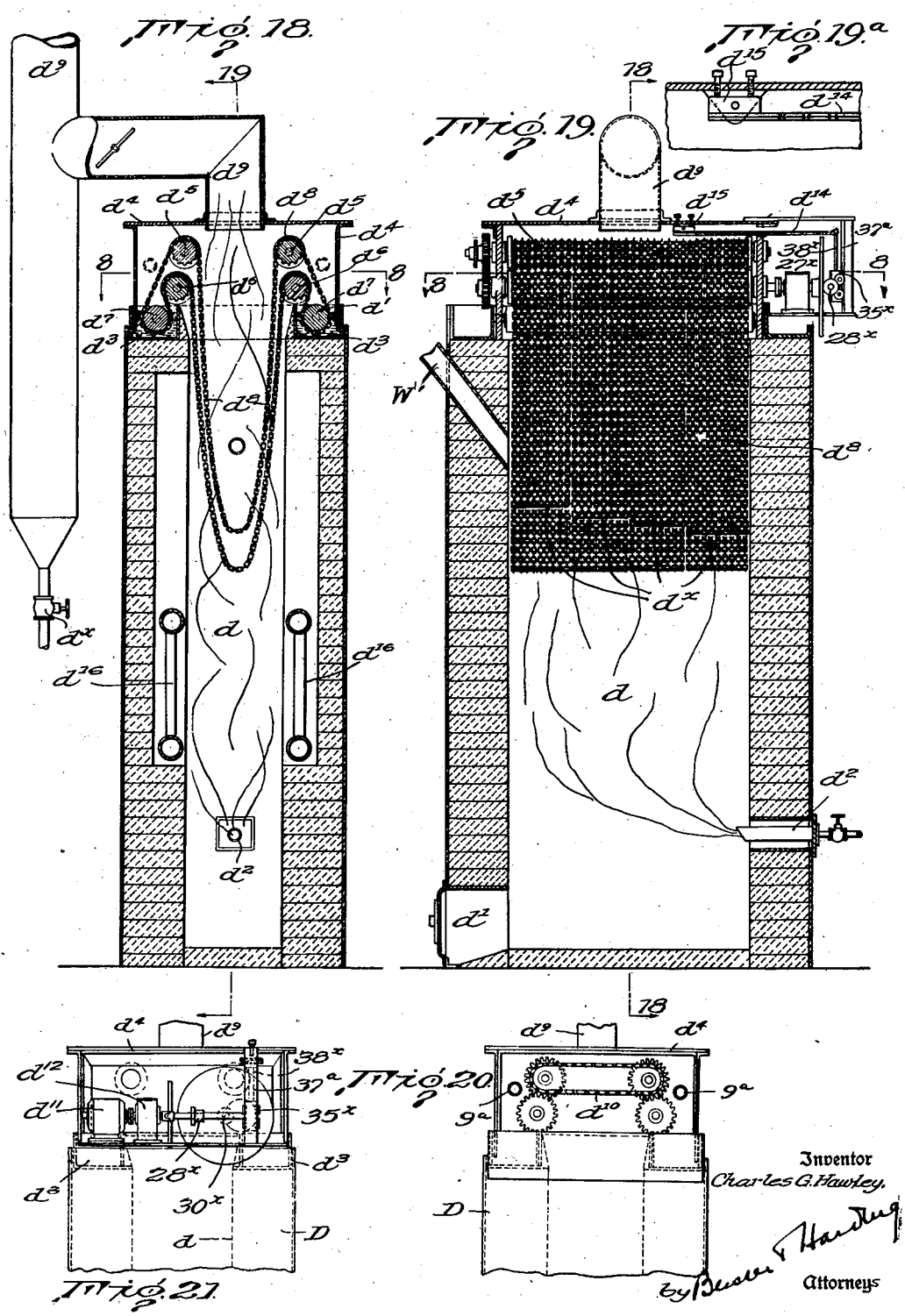

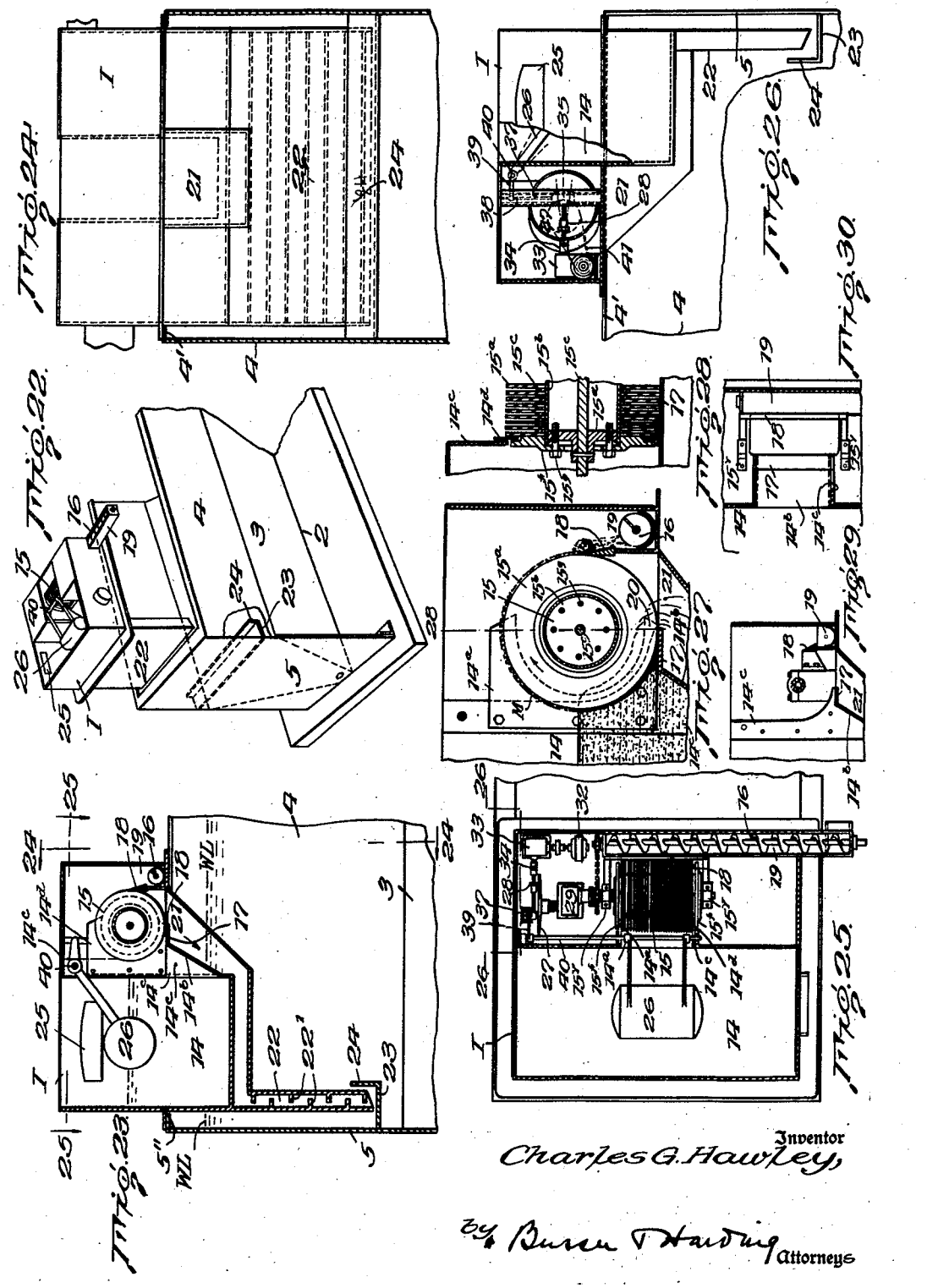

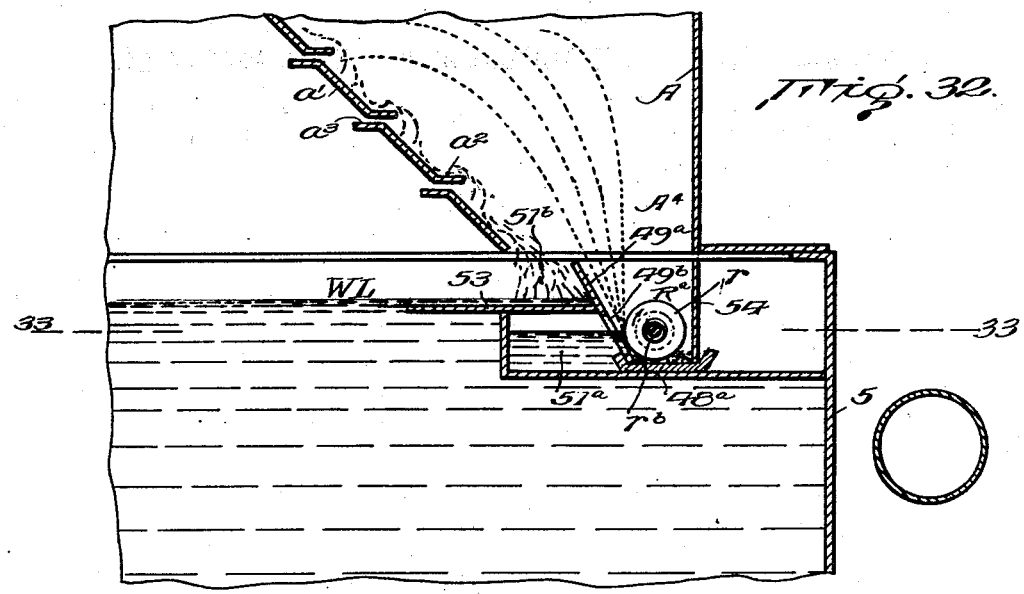
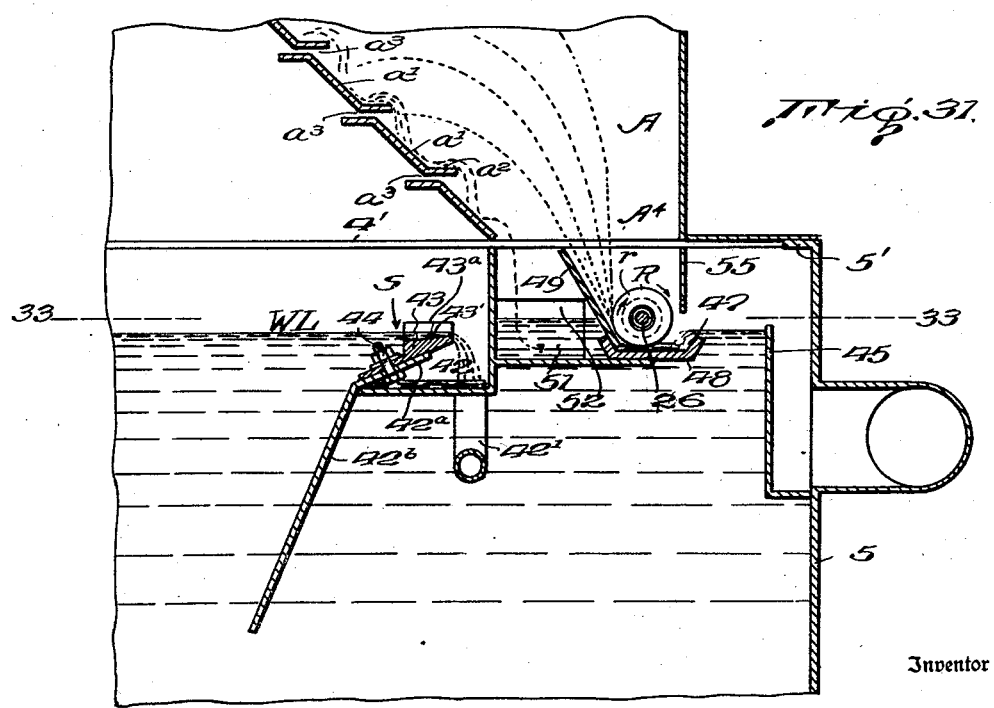

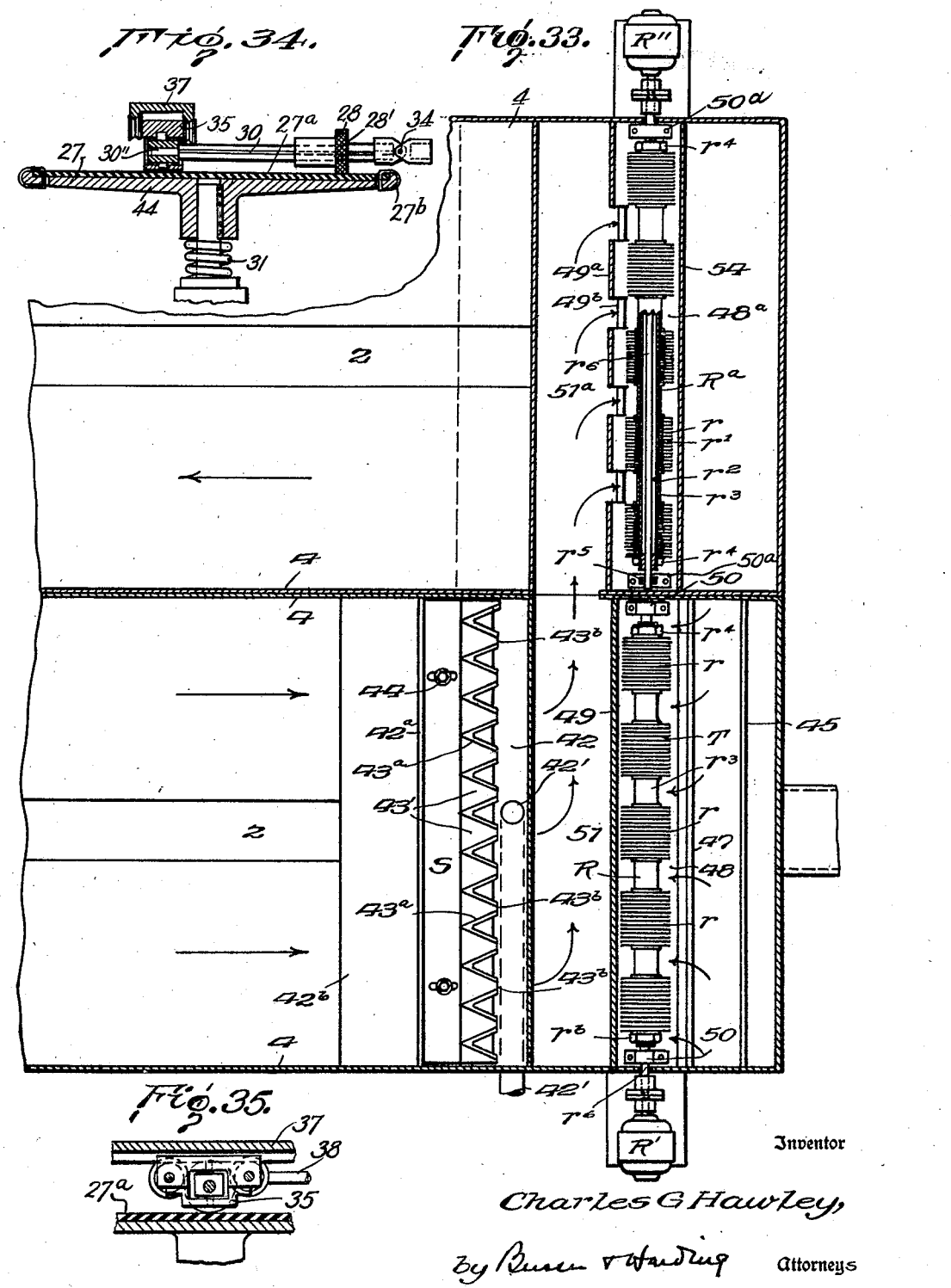

Patented June 23, 1942

2,287,427

UNITED STATES PATENT OFFICE 2,287,427

SYSTEM OF WATER PURIFICATION AND WASTE DISPOSAL

Charles Gilbert Hawley, Chicago, Ill.; Hope Hawley Degenhardt and Virginia Taylor Hawley, executrices of Charles Gilbert Hawley, deceased, assignors, by mesne assignments, to Hawley Engineering Corporation, Cleveland, Ohio, a corporation of Ohio Application January 15, 1937, Serial No. 120,792

2 Claims. (Cl. 210—2)

This invention relates to improvements in and for the purification of flowing streams of municipal and industrial intake and outfall waters. Intake waters are those prepared for use; while outfall waters are those which having been used are wasted; usually into larger bodies of diluting water and most frequently into that river or lake from which the same or other intake waters were derived; explaining the imperative necessity of adequate water treatments for both intake and outfall waters.

Public health and comfort and industrial needs demand these operations but the costs thereof, as now practiced, are so oppressive that few communities and still fewer industries can afford them. Not only must the water be purified but the impurities removed must be disposed of without public danger or discomfort; and, the safe disposition thereof has in itself greatly increased the expense of water treatment, particularly as applied to sewage.

It is not to be denied that many present methods and systems attain excellent results, proving that good work can be done. But if extensive public and industrial benefits are to be secured, the costs and expenses attending such treatments must be greatly reduced. As the matter stands, only wealthy communities can afford them and even they suffer from the lack of sanitary safeguards throughout contributing water sheds.

While applicable in the extensive manner required for large cities, this invention is particularly concerned with supplying at low cost the requirements of small communities and most industries. They can not possibly compass or afford treating systems of present designs, nor the operating costs identified therewith.

Better than standard results are now being secured by the present invention and are desirable, but it is at once to be understood that the primary objects and accomplishments of this invention have to do with reducing the original cost of disposal plants and the time and labor required to set up and operate them.

Specific objects are to provide purification and disposal methods and systems of comparatively abbreviated and simplified forms; mechanical in nature, and preferably, suited to quantity (factory) production, as contrasted with construction on the ground; and readily transportable; easy to install, operate and maintain; and adapted to all conditions of work and situations; and, by means of which fully adequate purifications and dispositions may be speedily and economically accomplished.

As indicated this invention is of a mechanical nature rather than biological; and primarily, a governing principle hereof is that present day dependence upon Nature's life processes is an economic mistake. Nature's processes are too slow and frequently prove unsafe when attempted within limited confines. In both the purification and the disposal branches of the art, and as exhibited herein, the prompt extinction and positive rejection of living organisms along with the matters upon which they thrive, affords greater assurance and quicker attainment of required results.

Proceeding upon this principle, it becomes possible to speed the work and as will be made apparent, it also becomes possible to perform that work in comparatively small and greatly simplified apparatus which does not require special skill for its erection or for its successful use.

The present invention is very simple and as will become apparent largely consists in avoiding the complications, difficulties and dangers which have thus far necessitated the costly extension of water purifying and disposal systems.

Another governing principle of this invention is that the cumbersome structures and methods now characterizing the art must be abandoned and if better public waters are to be promoted a simpler method must be employed and further all essential structures may be better made of durable, shock-resisting, easily preserved metal; and, in sizes and weights admitting of ready transportation and ready placement in numbers or assemblies suited to the individual communities and industries to be served.

Specifically such systems or plants include settling tanks and the removal of sludges, and even when small, must be capable of continuous operation, with little attention; and, a further principle and step of this invention consists in initially removing from the influent water all matters which might occasion stoppage in any part of the system, thus insuring continuity of operation.

By this initial attack upon the problem all matters of objectionable size are at once removed and concurrently most of the planular and lighter matters, which latter so reluctantly yield to gravitational separation in flowing water, that it has been necessary to employ unduly extended periods of detention, resulting in overextension of apparatus. Further, more uniform and more densely concentrated tank sludges are formed; this being the result of removing many solids hitherto admitted to the tanks and connections of such systems.

In consequence of this initial step all succeeding steps of the process are definitely abbreviated and benefited. The materials thus initially abstracted are finally destroyed as by combustion, in the manner hereinafter explained.

A minor principle hereof but nevertheless one of much importance is that piping and valves should be and now are reduced to a minimum, this becoming possible because none of the matters here permitted to enter the sedimentation tank are of a clogging nature.

Hereunder, a slow sedimentation tank receives the partially purified water and while moving slowly forward therein the residual finer settable and floatable matters move (gravitate) to positions which facilitate their removal with small quantities of water from the bottom and top of the stream; the lighter rising to the surface of the quiet stream.

Both sedimentation and levitation are common in this art but have been improperly practiced, as evidenced by the fact that recontaminations of the stream have occurred, entailing poor end results; also burdensome system extensions. A definite provision of this invention avoids these and kindred difficulties by removing the settled matters in the form of watery sludge which is still fresh.

Under present practices sludges are retained until they have at least partially decomposed; i. e., become septic, gasified, and therefore prone to rise and recontaminate the water; and in most cases sludges have been retained until a state of decomposition termed "digested" has been attained, in the hope of reducing the solids and greases to relatively innocuous conditions, again entailing what are now seen to be unnecessary extensions of the system and making extremely difficult the production of proper systems effluents.

A partial exception to the common practice of discharging stale and odoriferous sludges is presented by the so-called activated sludge system; in which for a different reason great efforts are expended to keep the impurities in a fresh state. But for the purposes of this discussion such freshening of the sludge may be regarded as merely incidental for even that process is dominated by final decompositions and aftertreatments entailing offensive odors, difficult forms of vegetable and animal life and extensive equipments and labors.

In contrast, a further governing principle and intent of the present invention is that all impurities shall be taken from the stream quickly and in fresh, non-septic condition, and shall then be immediately destroyed; that is, disposed of while still fresh.

Employing the principle of prompt removal and destruction, this invention obviates present difficulties by removing the impurities while in fresh condition and hence, substantially odorless; and, by immediately desiccating and burning them. Further, the matters initially removed from the stream, as first above described, are similarly conditioned and are odorlessly burned, preferably in the same furnace.

Hereunder these steps or measures for the safe disposition of sludges are very simply made practical and odorless and chiefly because the impurities are fresh (adequately oxidized) when subjected to desiccation and combustion, and the evolved heat assists in the process of desiccation.

By preference floating matters, scums, taken from the tank or tanks with accompanying water, are also desiccated and their combustible portions are similarly burned.

The desiccation described involves the steaming off or distillation of the water content of the sludge; and a further step comprehended by this invention consists in condensing the evolved steam and taking it off as innocuous water, of very pure character.

The ash resulting from the described process of sludge combustion is one of the end products of this invention and has value. Otherwise no attempt is made to prepare the sludge solids for use as fertilizer. Merely desiccated products are deemed too dangerous. Instead this invention contemplates complete combustion of all organic wastes and any proper utilization of the evolved heat.

Next it is to be understood that the present invention is intended to be interposed and used where and when the water to be treated is relatively fresh. Even domestic sewage is usually received while still substantially fresh. For obvious reasons the treatment of septic water should be avoided wherever possible; in other words, measures should be employed to insure the delivery of the water to treating plants in so-called fresh condition.

If more or less septic water must be treated hereunder it is immediately aerated and supplied with oxygen as and when it enters the described system; and where a final effluent of high order is required, hereunder the water is always aerated and oxygenated as it leaves the primary sedimentation tank or tanks.

Initial aeration, and consequent oxidation, is here provided for septic water in order to insure the formation of fresh sludge in the sedimentation tank and to thus protect the slowly clarifying water against recontamination; and also to provide sludges that may be withdrawn and combustively destroyed without generating objectionable odors.

Aeration after sedimentation, as here described, is required for and accomplishes the oxidation and destruction of those organic colloidal and dissolved matters which generally persist or remain after mere primary sedimentation. Obviously, such deferred aeration occurs after the major impurities have been removed from the water, leaving only a minimum of work to be done by oxidation.

In practice hereunder, not part, but advisably all of the flowing water is finely divided and sprayed into the air, enabling the quick transfer of oxygen to the impurities of the water. The oxidized water falls into a separate tank, and in that secondary tank is subjected to further sedimentation, this for the purpose of clearing the water from the ash or residue of the described oxidation. Then the water is permitted to leave the system in a purified condition, usually, containing a measure of unconsumed oxygen. It is thus admirably suited for use, or, for discharge into diluting water.

The effects of such aeration, though here rapidly produced, appear to be precisely those that slowly take place in a body of diluting water. But here they are produced by mechanically subdividing the water in the air directly above the treating tank. Therefore this step of the process is one which may be always employed advantageously, for either of the purposes recited.

Importantly it is now demonstrated that organic impurities in flowing water may be destroyed by the direct transfer thereto of oxygen from the air; whereas in the past it has been deemed necessary to propagate and employ for the purpose immense colonies of oxidizing bacteria. Thus further evidence is presented, favoring the avoidance of nature's slower processes.

The described positive aeration of domestic sewage has this further notable and important effect: In the course of this process finely divided soapy matters (usually most difficult to remove) are aggregated and at once presented in the form of tank scum, easily disposed of along with other floating matters.

Briefly summarized and as distinguished from the more costly present-day processes, this invention consists in continuously accepting the flowing water which is to be purified and forthwith abstracting therefrom bulky matters and all such as might clog or interrupt subsequent operations, then reducing the stream's velocity of forward movement and thus permitting residual impurities to gravitate therein, continually releasing the purified stream, and, concurrently removing the gravitated impurities in the form of concentrated watery sludge still in fresh and substantially odorless condition, and, combustively destroying that fresh sludge.

Further defining the invention, the destruction mentioned is accomplished by heating and desiccating the watery sludge and sequentially burning the combustible residuals both to destroy organic matters and to supply heat for such desiccation, and yielding as one end product, an innocuous ash.

Next to be considered is the fact that this process of desiccation is performed at low pressure and that steam is evolved at a temperature coinciding with that pressure. And preferably such steam is condensed, yielding as another end product, innocuous water.

Hereunder the initially abstracted matters, the settled sludge, and the levitated sludge, may be subjected to such progressive desiccation and combustion in one and the same apparatus.

Finally to be considered is that step of the process that consists in aerating all of the water in the space or atmosphere above the stream; most importantly applied to the oxidation of organic matters that do not yield to gravitation. Here the invention resides in mechanically subdividing the partially purified stream and momentarily elevating or projecting the water into the air in the form of a fine spray or mist which readily accepts oxygen from the air, thereby destroying by oxidation the residue of dissolved and colloidal organic matters and usually discharging the thus purified water with an ample content of dissolved oxygen.

The invention also consists in employing the described aerial oxidation as a means of segregating finely diffused soapy matters which usually resist separation.

As before stated, the aerated water may be and usually is subjected to further gravitational clarification before it is discharged as finished effluent.

An added step optionally employed in this process and which will be described hereinafter consists in finely subdividing and mixing with the befouled influent water a light mineral oil, which oil suppresses odors and, more importantly, has an affinity for organic matters; with the result that such matters, being transferred to the oil, are presented and may be disposed of as scum. This is another way of quickly abstracting the finer objectionable matters and has the effect of suppressing bacterial development.

In addition the invention comprises one or more sedimentation tanks of novel form and few but novel appurtenances which are applied thereto for the performance of the different parts of the above defined process. All such mechanical elements will be fully described and clearly related.

Those who are skilled in the art will at once perceive the abbreviative value and the inherent merits and advantages of the above defined invention. In work preparation and in practice these become still more startlingly apparent.

It is believed that the foregoing description is sufficient to enable others to successfully practice this invention. Nevertheless each of these matters and some others will be further mentioned, particularly as exhibited in the novel exemplary apparatus which is illustrated in the accompanying drawings.

In said drawings:

Figure 1 is a perspective view of a single tank component or tank unit, of the trough-like cross section comprehended by this invention; Fig. 2 is a cross sectional view thereof; Fig. 3 is a perspective view illustrating this system adapted to the primary treatment of befouled water; Fig. 4 is another perspective view illustrating a unit as equipped for the secondary treatment of water; Fig. 5 is a perspective view of two such tanks and associated parts, together constituting a small but complete disposal system; Fig. 6 is a side elevation of the apparatus shown in Fig. 5; Fig. 7 is a plan view thereof; Fig. 8 is a horizontal section substantially on the line 8—8 of Figs. 18 and 19, to which later reference will be made; Fig. 9 is a plan view likewise taken from Fig. 19; Fig. 10 is a vertical longitudinal section on the line 10—10 of Fig. 7; Fig. 11 is a like section on the line 11—11 of Fig. 7; Fig. 12 is a vertical cross section on the line 12—12 of Fig. 7; Fig. 13 is a sectional view on the line 13—13 of Fig. 7; Fig. 14 is a section on the line 14—14 of Fig. 7; Fig. 15 is a section on the line 15—15 of Fig. 7; Fig. 16 is a section on the line 16—16 of Fig. 7; Fig. 17 is a section on the line 17—17 of Fig. 7; Fig. 18 is a vertical section on the line 18—18 of Fig. 19, better illustrating the construction and operation of the combined sludge desiccator and incinerator comprehended by this invention and first appearing in Figs. 3 and 4; Fig. 19 is a vertical section on the line 19—19 of Fig. 18. Fig. 19a details the fastening of the thermostatic speed governing bar; Fig. 20 is an end view of the upper part of the incinerator; Fig. 21 is an elevation of the opposite end thereof, disclosing the thermostatic mechanism by which the operating speed of this incinerator is governed in relation to the temperature of the fire therein; Fig. 22 is a perspective showing of the construction and application of the component initial purifying device or rotary screen to one of the tank units, as comprehended by this invention and first disclosed inclosed in Fig. 3; Fig. 23 is a vertical longitudinal section of that portion of the apparatus, substantially on the line 10—10 of Fig. 7; Fig. 24 is an end view taken from the line 24—24 of Fig. 23; Fig. 25 is a horizontal section taken on the line 25—25 of Fig. 23; Fig. 26 illustrates the opposite end of the screen box broken away substantially upon the irregular line 26—26 of Fig. 25 to disclose the variable speed mechanism belonging to the screen; Fig. 27 is an enlarged longitudinal and vertical sectional view better illustrating the construction and operation of the screen element; Fig. 28 is a partial sectional view of the rotary element of the screen on the line 28—28 of Fig. 27; Fig. 29 is a fragmentary vertical sectional view illustrating the construction of the screen box with the rotary element removed; Fig. 30 is a fragmentary plan view taken from Fig. 29; Fig. 31 is an enlarged vertical longitudinal section substantially on the line 10—10 of Fig. 7 and better illustrating the construction and arrangement of the scum skimming and the water aerating elements of this invention; Fig. 32 is a like view substantially on the line 11—11 of Fig. 7 showing the arrangement of the aerating element in the secondary tank; Fig. 33 is a similarly enlarged horizontal section taken upon the line 33—33 of Figs. 6, 31 and 32, and clearly depicting the construction of the aerating elements and the relation of the elements in adjacent tank units; Figs. 34 is an enlarged detail better illustrating the variable speed drive or apparatus which is employed with the rotary screen of this invention; and, Fig. 35 is a cross section substantially on the line 44—44 of Fig. 34.

In support of these extensive drawings it is explained that they are not only illustrations but also working drawings, which though not dimensioned are properly proportioned and may be used with full assurance of obtaining the demonstrated results herein described.

Ordinarily such a system should be decked or housed to avoid disturbance of tank scums and to ensure reasonable working temperatures. A variety of architectural adjuncts are obvious and do not require illustration.

Though not feasible herein to set forth all possible forms and uses of this invention, some more extended than others, all can be made clear by considering the invention as a system of domestic sewage treatment and disposal, which branch of the art is all inclusive in its requirements. Other uses will be apparent to those who are skilled in the allied arts of treating large volumes of potable water, and, the voluminous wastes of various industrial plants embarrassed by organic matters; such as packing houses, paper mills, scouring plants, canneries and the like. Various other uses may be served, including those that require the introduction of chemicals, for which simple provisions are here made.

As far as possible the further specifications will be abbreviated; lest the very simplicity and chief merits of the invention be lost among too many words.

For especial purposes or under favorable circumstances the tanks for this invention may be made in different sizes and of wood or concrete but numerous advantages and economies are obtained by the novel practice and design herein laid down.

Hereunder standard metal tanks are produced all of one size and that size one which is suited to quick construction, easy transportation by rail, ship or road, and easy placement upon the selected ground. As will be seen any number thereof may be placed side by side, to afford requisite capacity.

Practically, the largest basic unit recommended is of length, height and breadth suiting it to railroad transportation. As will be made clear the weight of such metal units is not great per unit, and they may be cheaply produced in a central factory; and, whether in complete or knock-down form, are thus suited for cheap transportation and erection.

The open topped standard tank unit of this invention is best identified in Figs. 1 and 2 of the drawings. Its length is from six to seven times its width and its height or depth is substantially one and one-half times its width. As here shown, the water moves lengthwise in each tank and its narrow width obviates tortuous and cross currents therein, without the aid of longitudinal subdivisions in the tank. However, dividing plates may be hung in the tank whenever desired, all of the hereinafter described internal equipments of the tank being designed to admit them.

This tank unit as shown by Fig. 2 is entirely composed of metal plates and is of a V-shaped, trough-like form, presenting a narrow floor 2 and steeply slanted side portions 3, 3, topped by vertical upper parts 4, 4. The downwardly converging side parts slant upon "two to one" angles, upon which precipitated matters will slide, to gather upon the narrow floor 2.

The ends 5 of the tank are preferably formed by rectangular plates, the bottoms 5' of which, with the trough bottom, provide an adequate base for the tank. Side brackets 7 are preferably used and add to its base.

The sides 4, 4, terminate in inturned flanges 4'. Likewise the ends 5 have top flanges 5'', and these with the bends 6, formed by the union of the parts 3 and 4, afford ample lateral strength. Therefore the longitudinally extended parts 3 and 4 may be made of relatively thin metal plates. The end plates are somewhat thicker and are welded or otherwise rigidly united with the parts 2, 3 and 4.

As shown in other parts of the drawings, a drag chain 8 carrying scrapers 8', (or other sludge conveyor) operates from end to end of the tank bottom; and to properly accommodate it, the bottom of the tank should be both straight and strong. Therefore that bottom is made of a metal plate which is thicker than the side plates and becomes a rigid sludge trough. That element comprises the portion 2 and integral side portions 2' which terminates in out turned stiffening flanges 2''. Such trough bottom extends from end to end of the tank. The edges of that trough are tightly jointed to the lower edges of the parts 3, preferably by leak-proof autogeneous welds. Rivets or bolts may be substituted when a tank must be shipped "knock down" to a place where welders are not available. Obviously, the parts marked 2' become parts of the tank sides and have the same steep inclinations.

In practice, the drag chain 8 moves slowly in the trough portion of the tank and delivers settled matters to one end thereof. At that point the tank has a sludge discharge opening and a riser, 9, through which sludge is conducted to the sludge "Incinerator," before mentioned. The said riser may be on the exterior of the tank as shown in Figs. 1 to 5 or upon the interior, as shown in Figs. 6 and 7. In all cases the tank is provided with a drain valve 9'.

The drag chain is a single sprocket belt 8 upon which the flights or scrapers 8' are spaced. It runs over sprocket wheels fixed in the middle longitudinal plane of the tank. By preference the drag is driven from the top of the tank as shown in Figs. 3 to 5, but if desired, one of its submerged sprockets may be driven through a stuffing box 10 on the lower part of the tank, as in Figs. 10, 11 and 12.

In practice the movement of the drag chain should approximate one foot per minute, a speed which presents the sludge for discharge while still fresh and not high enough to cause turbulence.

Obviously the installation of the riser and of the sprocketed drag chain serves to complete the basic unit and make it ready for transportation and for the "field" addition of all other parts required by the service to be performed, and which parts are separately manufactured, as detailed hereinafter.

A few cross ties (not shown) may be installed between the tank sides and will prove useful when an empty tank is being handled, but are not essential as supports for the self stiffened tank sides.

It is to be noted that tanks of this design have no parts extending from their sides to prevent the placing and fastening thereof side by side for mutual support upon a common base.

The smallest water treating system contemplated is large enough to serve an ordinary community or industry and comprises one such tank unit equipped for either "primary" or "secondary" use. A single unit suitable to primary treatment hereunder is presented in Fig. 3 while Fig. 4 shows how the unit is equipped to effect the "final" treatment of water.

A primary treatment unit, as shown in Fig. 3, is equipped with a box-like element, I, adapted to perform the office of receiving the raw influent water and initially abstracting an important portion of impurities therefrom before the water begins its forward movement in the settling tank. That element I, is detailed in Figs. 22 to 30. Next the tank is equipped with a wringer W, and with a combined desiccator and incinerator D, adapted to care for the initially abstracted matters and also the bottom sludges which are delivered to the element D through the before mentioned riser 9. The element D is detailed in Figs. 8, 9, 13 to 20. Finally the outfall end of that tank is provided with a scum skimmer S, positioned in advance of an effluent outfall 11. The skimmer S is detailed in Figs. 31 and 33. The part O represents an oil or scum separator which accepts watery scum from the skimmer S and discharging excess water prepares the dirty oils and greases for consumption in the incinerator D. An oil conduit between O and D is presumed (not shown).

A secondary treatment unit, as depicted in Fig. 4, is equipped with an influent trough 12, usually entering its side, and importantly, is equipped with a motor driven device and housing, A, whereby and wherein all of the influent water is progressively converted into mist or fine spray and therefore intimately admixed with air continuously admitted to the housing A. From the element A, the aerated water falls into the underlying tank. The mechanical details clearly appear in Figs. 10, 11, 16, 27, 31, 32 and 33. Moving slowly upon the water filling the tank, the residual scums, before mentioned, encounter and are discharged through a skimmer S' while the purified water is discharged through the end outfall trough T and pipe T'. In Fig. 4, the part 13 represents the discharge opening of the skimmer S'.

Throughout the drawings, the water levels or surfaces, in the filled tanks, are marked WL.

The cost of these fully equipped units and of handling and installing them is so low that even small communities may well afford to use them in pairs and thereby provide for the complete treatment and disposal of either intake or outfall waters. They are so shown in Figs. 5, 6, 7, 10, 11, 12, 13, 14, 15, 16 and 17. Such a system even for the complete disposition of sewage need comprise no more than a pair of these units, placed side by side upon a surface or platform easy to enclose in a small house. Indeed, the use thereof upon all watersheds would eliminate the extended sewers now-a-days deemed necessary.

When so positioned in pairs, the primary unit is best provided with an aerating equipment, thus doubling the provision for the aeration of the water.

Under this process, the water oxidizing mechanism then belonging to the primary tank is employed to elevate the water into the air and the aerated water most conveniently falls into a cross-trough, through which it flows to the aerating mechanism in the secondary tank. The water is there received upon a higher level than that maintained in the primary tank, and most conveniently, it thus becomes possible to deliver scums, taken from the secondary tank, directly upon the water in the primary tank and to dispose of them through the primary skimmer S and a single oil separator O.

The overall effects secured by these dual units will be understood from the foregoing description of the process as practiced hereunder. It need only be explained that sedimentation of water in each tank should be conducted slowly, a two hour period of detention therein being recommended.

The tank units best suited to American railroad transportation may be approximately forty feet long, six to eight feet wide and nine to ten feet deep and are intended to work upon the basis of two hours detention, per tank. Longer or shorter periods, rest in the discretion of the user.

Conservatively, the effective cross section of such tank is presumed to extend from side to side thereof and from water level WL, to a point half way between the angles or bends 6 and the bottom 2, the water in the lower part of the tank being counted as relatively inactive. From the above working figures it will be apparent that the unit of this invention is of amply large capacity, as measured in gallons passing therethrough per day, even allowing for full two hour detention. Greater capacities may be secured by increasing the number of the units.

These dimensions are arbitrarily chosen in order that all parts, having best been made in a central factory, may be conveniently shipped upon standard American railroad cars as well as by road and ship. But, obviously, the invention is not limited to stated dimensions for it may be practiced in apparatus of either smaller or larger size; and in other countries these metal tanks doubtless will be constructed to accord with available means of transportation. Whatever the dimensions, the advantages of standardization definitely benefit both maker and purchaser.

Referring now to Figs. 3, 5, 7, 10, 12, 13, 14 and 22 to 30, it will be seen that the described "initial" treatment takes place within the element I. This is designed to be separately made ready, and then lowered into and upon the end of the complementary tank unit.

Said "initial" element I, contains a space or well 14, which receives the sewage. That well is small, shallow and turbulent and the sewage is only briefly retained therein. Nevertheless heavy masses settle therein, to be removed manually when convenient. The element I, also contains a part 15, which is a rotary continuous sewage screen, which presents many narrow openings and yet is self-cleaning.

The sewage from the well 14 passes through that screen and thence into the settling tank. Only partially submerged and being rotated slowly, the screen serves to intercept matters which are larger than its openings and many which are smaller. Being rotary it also serves to lift the intercepted matters out of the water and discharge them as screenings of relatively dry character. A conveyor 16 also within the element I serves to receive such screenings and deliver them, preferably first to a wringer W and then to the incinerator D.

The element I further contains a mechanism for slowly rotating the screen and the conveyor 16. Both may be operated at unchanging speeds but as will be explained it is preferred that the driving mechanism be such that the rotative speed or the screen is made to vary automatically in response to the changing quality or character of the sewage. Such variation serves to prevent the flooding of the well 14 or screen 15.

By means of the automatically varied low speed of the screen it becomes possible to build upon the screen and to constantly maintain thereon a mat or accumulation of sewage matters; and such mat serves to intercept, retain and present as screenings, even very fine solids and also scums and many viscous and gelatinous matters, which hitherto have defeated or prolonged sedimentation processes.

The general nature and functions of the element I, being understood, attention is directed to Figs. 22 to 30, wherein the novelties thereof are most clearly shown and from which it will become evident that this feature of the invention is both simple and efficient and in different sizes is suited to a great variety of uses.

Figs. 23, 24, 25 and 26 depict the limited size of the turbulence well 14 also the outlet opening or pocket in the side 14$^a$ thereof, through which pocket the water flows to the rotary screen 15. It is important that little organic matter be suffered to remain in the well, hence the turbulence mentioned and it is quite as important that the water shall quietly approach and overflow through the screen. Such are the uses of this novelty small reception well.

The screen may be positioned across a flume or trough but operates best when, as here shown, it is thus guarded from the direct thrust or impact of the influent stream. A quiet hydraulic head of a few inches, as here shown, suffices for flow, and, forcible clogging of the screen spaces is avoided.

The screen 15, best shown in Figs. 27 and 28, comprises a large number of easily cleaned concentric and parallel thin disks 15$^a$, closely spaced perpendicularly upon a common shaft or holder and arranged for simultaneous rotation. The peripheries and the sides of the disks are smooth. This screen is positioned in the pocket 14$^a$, which is constructed to embrace the flooded parts thereof and the screen provides the only avenue through which the sewage may pass from the well 14 to the underlying tank.

The sewage passes through the spaces between the screening disks, leaving an accumulation or mat M of sewage matters upon and across the intake side of the screen. As will be apparent, such accumulations form continuously upon the submerged part of the slowly rotated screen. They are continuously taken from the non-submerged back portion of the screen.

The rotating screen first receives and retains the intercepted matters and then raises them above the surface of the water in the well 14. Considerable drying and capillary draining of the mat, whether thick or thin, occurs while it is held in the air upon the upper and back parts of the screen; and, a thin edged bar 18 coacting with the moving screen serves to remove or peel the relatively dry mat from the disks, as well illustrated in Fig. 27. Thereupon the screenings fall into the trough 19, to be carried away by the conveyor 16.

In practice, a disk spacing of thirty-two to forty thousandths of an inch thus serves to exclude from the sedimentation tank all coarse matters and all sticks, straws, strings and the like which might clog or stop any part of the system, thus serving a primary purpose of the invention. In so doing, and through the medium of the mat M, the screen also intercepts many matters which would otherwise pass through even such a fine screen thus serving a further important purpose of the invention.

At this point, it may be mentioned that the invention comprehends the employment of this same screen as a means of measurably dehydrating watery sludges taken from the sedimentation tank. In such case the sludge is discharged into the well 14 and joining the other sewage, is finely screened and matted, before going to the incinerator. Indeed this practice reduces the step of desiccation and in many cases will be found entirely satisfactory. No drawing has been made to show the means for transferring sludges to the screen well, for such simple apparatus seems obvious.

Stones and like heavy masses are not strongly enough held against the screen to be raised and discharged over the same and to insure the rejection of such masses the lower portion 14$^b$ of the pocket 14$^a$ is made steep and at the top is completed by a narrow "caulking strip" or bar, 17, like a threshold, which is positioned close to the bottom of the screen but not bearing against or touching it. Rotation of the screen in the direction of the arrow (Fig. 27) constantly pushes matter backward on the caulking strip 17, while at the same time the flow of water constantly pushes or caulks fine matters forward into the wedge-like space between the bottom of the screen and said strip 17. This is an important relation, for thereby the screen is permitted to rotate at any required speed, without exposing or baring the bottom part thereof and influent sewage is always compelled to pass the bottom of the screen through a considerable protecting or "caulking" mat or layer of collected matters.

In detail, the sides of the pocket 14$^a$ are completed by the shaped plate portions 14$^c$ and by so-called removable cheek plates 14$^d$, both of which conform to and coact with the end disks of the screen. Preferably the cheek plates 14$^d$ work in respective grooves 15$^x$ of the rotary screen and are so positioned they prevent the escape of sewage past the ends of the screen and yet do not interfere with the rotation of the screen.

By preference the disk holding part of the screen is tubular (see part 15$^b$) and is mounted upon a central shaft 15$^c$, as by end parts 15$^b$. The disks obviously are ring-like and they are separated by smaller ring-like spacers 15ᵉ. All are first loosely assembled on the tube or sleeve 15ᵇ and are then bound in place thereon by means of heavier end-disks 15ᶠ. The latter telescope upon the ends of the tubular part 15ᵇ and are adjustably tightened by means of bolts 15ᵍ threaded into the parts 15ᵈ.

The lower part of a hole 25 in one wall of the well 14, is below the level of the top of the screen 15, and when the rotation of the screen is too slow or is stopped while sewage continues to flow into the well, the sewage promptly rises to and overflows through that hole 25. The sewage cannot overflow the screen. By preference a down spout 25ᵃ directs the overflow into the trough T of the next unit, thence to be discharged from the system. A by-pass is thus provided. As will be apparent, when screen stoppage occurs the mat M becomes so thick that flow of sewage through the screen is diminished or interrupted, causing the level of the liquid to rise in the well 14.

Just such variations of level in the reception well 14 and which thus directly respond to the varying thickness of the mat upon the screen, are utilized to govern the speed with which the screen normally rotates. To that end a pivoted float 26 is provided in the well 14 and is made to operate a speed varying mechanism belonging to the screen. That mechanism is most clearly shown in Figs. 25, 26, 43 and 44 and is characterized by a part 27, resembling a friction disk, and by a coacting shiftable part 28, resembling a friction pulley. The mechanism is simple but substantial and functions automatically. It does not require extended explanation.

Referring to the drawings it will be seen that the disk 27 has a fixed center and is connected with the screen shaft through the medium of a slow speed reduction gear 29. The fixed bearings of the screen shaft are marked 15ʸ. In contrast the pulley 28 is splined or keyed to a cross shaft 30 and is movable endwise on that shaft. The pulley 28 is always in working contact with the face of the disk 27.

The shaft 30 and pulley 28 are driven constantly and to obviate slippage, the disk is provided with a soft, tough facing 27ᵃ, usually canvas backed sheet rubber, secured thereon by lacings 27ᵇ; and, the face 28' of the pulley 28 is serrated or knurled so that it may gear into the softer rubber. A coiled spring 31 constantly holds the disk against the pulley. The shaft is driven quite rapidly but at fixed speed by a motor 32, through the medium of a reduction gear 33 (see Figs. 25 and 26). The speed of shaft and pulley 28 should approximate seventy revolutions per minute in order to insure quick shifts of the pulley in the manner about to be described.

It is to be noted that the shaft 30 does not extend rigidly from the gear box 33. Instead it contains and is propelled through a universal joint 34 which permits the shaft 30 to be deflected with respect to a radius of the disk 27. For that purpose the free end 30" of the shaft 30 has a bearing in a swivel block 35, which block is coupled with the before mentioned float 26. The block 35 is guided by a fixed column 37; and mounted upon small anti-friction wheels, the block resists the thrust of the spring 31, directed through the pulley 28 and shaft 30. The connection between the swivel block 35 and the float 26 is here established through a rod 38, an arm 39, and, the rocking shaft 40 belonging to the float 26.

A normal working level is established in the reception well 14, about as shown in Figs. 23 and 27; and the parts 26, 40 and 35 are adjusted to then hold the shaft 30 in neutral or radial position with respect to the friction disk 27. Thereafter, movement of the float either up or down is communicated to the block 35 and hence to the shaft 30, and the latter is deflected without interrupting its rotation. Either motion throws the friction pulley into non-rectilinear position with respect to the face of the disk 27 and in consequence the constantly driven pulley forthwith starts to spiral inward or outward on the disk 27, according to the direction in which the free end of the shaft 30 is deflected.

Thus a rise of level in the well 14 causes the friction pulley 28 to spirally travel inward toward the center of the friction disk and gradually increases the rotative speed of the disk and the screen. Such rise in the well is indicative of the growth of a mat, M, which is thicker than it should be; and due to the increased movement of the screen that mat is then quickly thinned, allowing the liquid level in the well to fall to normal. Reversely and as often happens, the sewage may be thin (contain few solids) and the freer discharge of sewage through the screen results in lowering the level in the well. At such times a reverse deflection occurs, with the result that the friction pulley is caused to spiral outwardly upon the friction disk 27 and the screen speed is materially reduced, allowing the mat of sewage matters to build to normal effectiveness and cause the normal well level to be restored.

Practice demonstrates that the screen rotation need not exceed one revolution per minute when heavy or rich sewage is being treated and may be as low as one-eighth revolution per minute when the sewage is light or thin. Obviously, the speed of the rotary screen whether fixed or variable should always be suited to the character and volume of the liquid to be treated.

Most conveniently, the conveyor 16 is driven from the shaft of the screen, as through large and small sprocket wheels and a sprocket chain 41, as shown in Figs. 25 and 26.

The flow of sewage through the screen is well depicted by the dotted lines 20 of Fig. 27. The bettered sewage falls beyond the caulking strip 17 and into a channel 21. That channel is attached to the bottom of the box-like element I, and enters into the top of a depending and wider down-channel 22, which serves to distribute the sewage across the whole width of the underlying tank.

By preference, the upright channel 22 contains a plurality of fixed alternated flights 22' which compel both lateral dispersion and repeated rolling actions of the falling liquid. Such actions tend to agglomerate residual sewage solids and are of value; especially when mineral oil is employed in the system as about to be described. By preference, the end 5 of the tank is provided with a cross member or trough 23 having an upstanding lip 24. These deflectors change the downward flow of the water and direct the stream gently upward, so that residuals of less weight than the water are promptly delivered to the surface of the liquid in the tank, thereafter to be disposed of as scum. The much purified water there begins its slow forward movement in the tank.

When noxious sewage is to be treated, or when disease is prevalent, or when an added ingredient is required for the affinitive retention of dissolved and suspended organic matters in the manner hereinbefore described, a stream of mineral oil, such as kerosene, is introduced into the well 14. That oil suppresses odors and immediately begins to combine with organic matters and partially clarified by the screen enters the down channel 22 where by the rolling action described it is further admixed with the sewage and intimately contacted with residual organic matters. Being directed upward by the deflector (23 and 24), the oily mixture, much burdened with organics, is delivered to the surface of the main stream, while the further purified water moves forward in the lower part of the tank. The oily scum thus formed upon the water is removed at the skimmer S and thence into the separator O. Only heavily befouled oil need be taken off for consumption in the incinerator. The remainder is clarified and returned to the intake well 14; in other words, an oil circuit is established. No large volume of oil is required.

In like manner, chemicals, either acidulous or alkaline, may be introduced into the system when considered helpful; and in this system chemical precipitates are no more difficult of disposal than are the ordinary fresh sludges.

Present day sewage systems are seriously injured when waste lints, oils, greases and chemicals are discharged into the contributing sewers. In direct contrast it is to be noted that the present system permits such practices; for this system cares for all thereof and is independent of biological aids.

The direction of liquid movement in the paired tanks is indicated by arrows. As previously described, the gravitational separation of impurities results in the deposition of fine solids upon the bottom of the tank and in the formation of scum upon the surface of the slowly moving stream.

The novel skimmer provided for removing or decanting the described scums is most clearly detailed in Figs. 31 and 33. In advance of the tank outfall, whatever its kind, is a cross trough 42, having a drain 42' which leads to the separator O. The upstream wall 42ª of the trough terminates below the water level WL and serves to support a movable cross bar 43, adjustably attached thereto by means of locking bolts 44. The bar 43 extends from side to side of the tank. It presents a slightly inclined "leading surface" 43' and is so adjusted that a layer of water and scum will flow by gravity over its high edge. The part marked 42ᵇ is a depending baffle, aiding the collection of floatable matters.

Any solids that are engaged or entangled with the slowly moving scums are found at the bottom thereof and to successfully discharge such scums they must be floated off on a layer of water. Desirably the quantity of water so discharged should be small; in order that the work of final desication shall be minimized. With such ends in view the top 43' of the bar 43 is provided with a plurality of upstanding V-shaped scum guides 43ª having between them only narrow discharge openings 43ᵇ. Scum carrying streams of considerable depth may be discharged through these narrow openings 43ᵇ with little excess water. By preference the complete bar 43 is a casting, and a packing strip is used between it and the trough wall 42ª.

The part 45 appearing in Fig. 31 is an emergency outfall weir provided in the end of the primary tank. It serves for the direct discharge of a primary effluent at times when the hereinafter detailed aerator is shut down and ceases to transfer the effluent of the primary tank to the head of the secondary tank, as is characteristic of the sequentially arranged units of Fig. 5.

However, the water level in the primary tank is not normally permitted to rise high enough to be discharged over the weir 45. Instead, the primary tank has a lower, normal outfall weir 47. This normal weir is provided by one edge of a slightly submerged shallow channel 48, the other edge of which is extended in and by a steeply inclined plate 49, welded thereto. Coacting with those parts and always partially submerged in the water constantly occupying the channel 48, is an effectively cylindrical high speed rotary element R which is the aerator proper of this invention. That element R, the best construction of which will be described, has fixed journals or bearings 50 at the sides of the tank and is rotatively propelled by an electric motor R'.

Rotating in the direction of the arrow (Fig. 31) and taking water from the close angle formed by the parts 48 and 49, this rotor continuously breaks up and throws the water upward in the form of mist or fine spray. The finely subdivided water enters and is amply supplied with air within the before identified aerating chamber A. The resulting oxidation of impurities has been described. The water falls in the same chamber. Paralleling the rotor R is a trough 51 of which the plate 49 is one wall and wherein the falling water is gathered.

The chamber A has an open top for the admission of air and in its lower part contains a secondary air mixing element, comprising an inclined floor $a'$, which directs the falling water into said trough 51. The inclined floor has many steps or flanges $a^2$ so that the falling water cascades thereon and further that floor has air admission slots $a^3$ beneath those steps $a^2$, to further insure the admixture of air with the falling water.

In the second tank there are like parts 48ª, 49ª, Rª, 50ª, R'', and A, crossing the second tank and preferably in linear alinement with those in the primary tank; and serving like purposes. But the reception trough is there divided into two stories, the lower one 51ª communicating with the trough 51 through a properly sealed opening 52 provided in the abutting sides of the tanks; while the upper story portion 51ᵇ is bottomed by a raised floor portion 53. The water which leaves the primary trough 51 flows into the channel 51ª, and is distributed to the rotor Rª through openings 49ᵇ, provided in the inclined wall 49ª.

The trough like cavity containing the rotor Rª is closely conformed thereto by a back plate 54 the lower edge of which is welded to the part 48ª. A similar splash plate 55 is provided for the rotor R but is spaced from the channel 48 to allow the free entrance of water.

After having been elevated above the primary compartment the water is caught and again elevated by the action of the rotor Rª to be collected in the trough 51ᵇ and discharged over the raised floor 53. Herein is found the explanation of the before mentioned fact that the water level maintained in the secondary tank is higher than that in the primary tank, a relation rendered possible by the nature of the water aeration step of this process and here utilized for structural simplification and in order that scums developed in the secondary tank may be gravitationally returned to the skimmer S in the primary tank, instead of being left for more difficult disposal.

As before stated, a like skimmer S', at the foot of the secondary tank empties its scums into the primary tank, and obviously the effluent discharge T of the second tank is of a corresponding high level.

At this point attention is called to the fact that the herein exhibited ability to elevate the sewage and to deliver an elevated effluent, is a definite feature of the present invention. Clearly the aeration of the water hereunder involves not only the sub-division of the water in the presence of air but also its actual elevation into the air; and it follows that the water having been elevated need not be suffered to return to the level from which it originated but may be delivered at a higher level.

While not specially illustrated herein, the invention comprehends an arrangement of tank units at successively higher levels and the delivery of an aerated or oxidized effluent at a level, which contrary to common practice, is well above the influent level of the system. Further, it will become apparent that this elevation which brings about purifications of high order, is accomplished by the expenditure of very little power, another definite gain.

Special interest attaches to the motor driven means required by this invention to finely subdivide the water in admixture with air and involving a considerable elevation of the water. If the consumption of power is to be minimized, pumps, spray nozzles, rotary paddles, and, beaters, must be avoided; for all of the water should be so moved, and, such processes of displacement involve the expenditure of too much power.

Aeration may be imparted to only a limited portion of the water, resting dependence upon ultimate diffusion thereof in the remainder of the water. But it is well known that the oxygen containing capacity of water is small and it is far better to break up and present all of the water to the air, as here practiced. This being true power consumption becomes a matter for serious consideration. To be practical the work must be done simply and cheaply.

In contrast to former systems, this invention rests upon the pirnciple of utilizing the surface tension of water to momentarily engage a film of water with a rotary element which is to move and elevate it. Next, that element is rotated at a speed which overcomes such surface tension of the water film and causes its disengagement in film formation. As well known, when such a film is liberated in air, it immediately divides into many fine particles.

Next to be observed is the fact that such centrifugal disengagement requires a definite rotative velocity; not great, but which always develops sufficient momentum to project the disengaged water a considerable distance in space. Under the control of the closely positioned parts 48 and 49, the trajectories of the disengaged water here take place in an upward direction and toward the slanting floors of the aeration chambers thus permitting the water to find a supply of oxygen in the air which constantly occupies and circulates within each aerating chamber A. (See dotted lines, Figs. 31 and 32.)

From the foregoing it will be understood that the described rotors R and $R^a$ present merely plain surfaces to the waters in which they are partially submerged. In practice, they are approximately six inches in diameter. Primarily they do not displace the water but are merely wetted or filmed with water. The quantity of water carried upward per unit of movement is obviously small but a six inch rotor driven at approximately thirty-six hundred revolutions per minute accepts and discharges films with such rapidity that in the aggregate a great flow of water is accommodated per unit of rotor length. Little effort is required and the power consumption is small. In this way all of the water passing through the system is projected into the air at little expense.

A simple cylinder may serve the purpose but as this phase of the invention is dependent upon the extent of the wetted surfaces per unit of rotor length, it is preferred that the rotors shall comprise a large number of coaxial, spaced disks which together offer more extensive surfaces for the reception and discharge of the water. This multiple disk rotor resembles the screen 15 initially employed in this system but these aerator disks are smaller and more widely spaced.

Aerating elements R, and $R^a$, of preferred disk construction are well shown in Fig. 33. As there shown it is preferred that the centrifugal disks $r$ shall be arranged in groups, a measure adopted to afford passages for the free admission and movement of air currents within the chamber A, even though the chamber A appears to be completely filled with fine spray. A better air balance is thus insured within the aerating chamber.

The disks $r$ and spacers $r'$ are mounted perpendicularly upon a central stiffening sleeve $r^2$. The parts $r^3$ are sleevelike spacers used between the groups of disks. After being positioned upon the long carrying sleeve $r^2$, the spaced disks are fixed or locked thereon, as by means of jamb nuts $r^4$. The rotor has journal portions which extend from the ends of the sleeve $r^2$ and which are lodged in the end blocks 50. By preference anti-friction bearings or ball rings (see $r^5$) are provided in the blocks 50, and, it is also preferred that the rotor journals be supplied by a central shaft $r^6$ to which the sleeve $r^2$ is keyed or pinned. Such shaft is coupled with the rotor motor and being an independent element may be withdrawn through the opening in the side of the tank when it is desired to place the otherwise complete rotor in the tank. or remove it therefrom.

The best transfer of oxygen to the water is secured when in this manner the water is broken into fine spray and presented to the air in mistlike condition. Therefore it is desirable that the spacing of the disks shall be comparatively wide in order that the water be not caught between the disks and projected in coarse drops or streams. That difficulty is here obviated by employing between the disks, spacers $r'$ which are wider than a "drop" of water, thereby obviating a capillary retention of the water.

The rotor has been mentioned as of six inch diameter. Obviously, the disengagement of the water is accomplished centrifugally and sufficient centrifugal force may be developed upon rotors which are either larger or smaller than here mentioned. But it is to be noted that the centrifugal advantage, in the matter of the detachment of water, lies in a rotor of minimum radius. It is also evident that being less retarded by the friction of the water, a small rotor can be more easily driven than one of larger diameter.

Most practically, the bearing blocks 50 are welded upon respective rigid channels 48, 48a, and are then machined, affording correctly alined substantial bearings for the shafts of the aerators. Further, each said channel and associated trough parts comprise a shop unit which, having been prepared, may be readily welded into selected tank units, without damaging the alinement of these widely separated shaft bearings.

Having followed the course and action of the sewage through the settling tanks, it remains to consider in detail those disposal elements which have to do with the impurities collected by the screen 15, by the scum separator O, and especially by the drag chains in the tanks. Hereunder all, such wastes are safely disposed of in the apparatus D, which has been named Incinerator.

Let it be here repeated that this invention provides for the final combustion of all objectionable and dangerous wastes taken from the water which is treated; and further it is to be remembered that all collected impurities which are taken from this system either contain water or are suspended in water, which water must be disposed of before the objectionable matters can be burned.

Both necessary processes (desiccation and incineration) are performed by an Incinerator element which is simple and cheap to build and to operate; as will be understood from a statement of the principle upon which it works. That principle is the ancient one of boiling water by putting hot stones in the water. But the present system demands continuity of action and the apparatus takes its form from that fact coupled with the fact that the desiccated materials must finally be burned. Another purpose of the invention is to present the dried materials, not in the form of cakes which must be broken down but in a pulverulent form which enables the immediate burning thereof in suspension.

Most conveniently, the incinerator is placed near the settling tanks and is low enough to hydrostatically receive the watery bottom sludges through the suitably valved pipes 9 and 9$^a$ rising from the tank bottoms and through a similar pipe (not shown) leading from the scum and water separator O. The wringer W, receiving screenings from the conveyor 16 and driven therefrom, is also higher than the incinerator and feeds the squeezed screenings thereto through a down spout $w'$ (see Figs. 3 and 5). A drip pan $w''$ receives the excess water from the wringer and discharges it into the tank on which the wringer is mounted.

As best shown in Figs. 15, 18 and 19, the furnace portion of the incinerator comprises the tall narrow combustion chamber $d$ having an air admission door $d'$ at the bottom and open at the top. This chamber may contain a fuel grate and door but usually it suffices to provide an oil or gas burner $d^2$ by which the furnace chamber may be initially heated. The sewage solids burned in this chamber furnish much if not all of the heat required to desiccate all incoming sewage wastes.

At the top of the furnace are two sludge reception troughs $d^3$ and a box-like head $d^4$. The latter, preferably bodily removable from the troughs, contains two groups of mutually driven sprocket rolls ($d^5$, $d^6$, and $d^7$) having flanged ends and together accommodating and propelling a long and wide catenary belt $d^8$ which is composed of many metal chains. Each trough contains one roll which is submerged in the sludges. Normally sludge is constantly supplied to both troughs $d^3$.

The catenary of the belt $d^8$ hangs within the upper part of the furnace. Either a single catenary or, as here shown, a dual catenary may be used. The latter is better adapted for use with two sludge troughs.

The shafts of the rolls are supported in the ends of the head-box $d^4$ and as shown the rolls of each set are geared together. The two sets are connected by a sprocket belt $d^{10}$ (see Fig. 20) and a single motor $d''$ serves to slowly drive all the rolls, a reduction gear $d^{12}$ being interposed.

The chain belt being made of many links provides many openings; that is, the metal belt is foraminous and therefore allows free upward passage of the gases from the combustion chamber $d$. The gases depart through a chimney or other exhaust connection $d^9$ at the top of the head-box.

To prevent displacement on the rolls, the component endless chains which make up the belt $d^8$ may be tack welded or otherwise joined in groups; and as here shown the different groups may be of different lengths and form steps $d^x$ in the catenary of the belt. The use thereof will be explained.

The hanging chain belt is heated as it passes through the furnace and moving into and through the troughs rapidly heats the incoming sludge and steams off the water, constantly thickening and sterilizing the sludge. The evolved steam immediately departs through the outlet $d^9$ and does not enter the fire chamber or interfere with the combustion therein. The metal chimney $d^9$ herein shown functions and represents a condenser, in which the low pressure steam quickly becomes water, for discharge at $d^x$ as an end product of the process, while the gases of combustion pass off freely.

As the chain belt leaves the sludge troughs comparatively cool, the thickened sludge adheres or clots thereon and so is taken from the troughs and carried downward into the hotter part of the fire chamber. There the residual water is quickly evaporated, leaving the solids to be shaken off the chains in dust-like form and thus in condition to be burned in suspension within the chamber $d$.

The screenings which enter the furnace through the spout $w'$ fall into the sag or bag of the broad chain belt $d^8$ and that belt being in motion the screenings are rolled and torn thereon until thoroughly dried; whereupon the screenings ignite and either burn while still in motion on the belt or fall through the openings of the belt and are burned in the lower part of the furnace. The steps $d^x$ in the chain catenary if used, assist in spreading the screening across the moving belt.

The clean, finished ash produced by this process is another of the end products hereof, as before mentioned.

Practice demonstrates that chain temperatures of 600 to 700 F. are adequate for the evaporation of the sludge and for the presentation of the solids in dry, burnable conditions and, that the metal chains long resist destruction at such temperatures. The temperature and quantity of the fire in the combustion chamber obviously varies with the quantity of air and fuel supplied thereto, and in order to keep the chains at these safe operating temperatures, the traveling speed thereof is here varied in inverse rotation to the heat evolved in the furnace chamber. To this end automatic speed varying mechanism is provided, said mechanism being of a kind identical with that before described in connection with the screen 15, but here thermostatically controlled as by an adjustable thermostatic bar, positioned in the furnace chamber.

This automatic speed varying mechanism is well shown in Figs. 19 to 21, where the characteristic parts are marked 27×, 28×, 30×, 35× and 38×. But in this case the operating rod, 38×, need not be actuated by a float. Instead it is connected to and actuated by free extended end of a bi-metal thermostatic bar $d^{14}$. That bar is most conveniently placed in the metal head-box and is fastened to its top by means of an adjustable fulcrum block $d^{15}$. Thus arranged the thermostatic bar may be moved and adjusted by hand while the furnace and chain belt are hot. Obviously, the heat deflection of the bar serves to move the block 35× of the variable mechanism. And by means of this manually adjustable bar the variable speed mechanism may be and is initially adjusted to a "normal" or neutral speed which corresponds to the temperature at which the catenary belt should be held. Thereafter any marked variation of temperature, one way or the other, results in a corresponding change in the traveling speed of the catenary belt; as required to prevent heat damage thereto or as required to prevent under-heating of that belt, which would slow down desiccation.

The parts $d^{16}$ which appear in Fig. 18 comprise a small steam boiler or generator, which may be installed in the furnace $d$, whenever there is use for pressure steam; as when it is deemed practical to substitute small steam turbines for the electric motors shown herein.

The invention is not restricted to simple unit systems for it is obvious that the system may be extended as by the addition of tanks and slight rearrangement of auxiliary parts.

I claim:

1. In a system practiced as herein described, two readily movable tanks set side-by-side and devoted respectively to primary and secondary sedimentation, in combination with an influent well, means for feeding raw sewage to the well, a continuous rotary screen and a screening conveyor removably positioned upon the head of the primary tank, conduit means for conducting the sewage from the well, through the screen and into the primary tank, a mechanism partly positioned in said well and controlling the rotation of said screen in inverse relation to the sewage level in said well, a scum skimmer at the foot of each said tanks, an effluent outfall at the foot of the secondary tank, aeration chambers respectively mounted upon the foot of the primary tank and the head of the secondary tank, a high speed sewage sub-dividing and elevating rotor positioned to remove sedimented sewage from the foot of the primary tank and, in the form of a fine spray, direct it upward into the aeration chamber thereon, a cross trough positioned in the primary chamber for the reception of the falling sewage, a similar rotor and a trough having lower and upper separated channels positioned in the head portion of the secondary tank beneath the aeration chamber thereon, means for rotating each of said rotors, the lower channel of the second trough receiving sewage from the first mentioned trough and directing the sewage to the second rotor while the upper channel of said second trough receives the sawage falling in the second aeration chamber, and feeds it into the main body of sewage in said secondary tank, a furnace adjacent said tank, having a movable foraminous desiccator therein, to which the screenings are fed by the screening conveyor, means to discharge sludge from the bottoms of the tanks to the desiccator, an offtake flue from the furnace, a condenser connected to the offtake flue, and means to move the desiccator to agitate the material fed thereto and deliver it to the furnace.

2. A device for the purification of water and disposal of waste, which comprises a settling tank and a container having a down channel having alternated internal flanges that cause repeated rolling actions of the descending water, in combination with deflecting means positioned at the lower end of said channel, and so arranged as to direct the flow of water discharged from said channel in a direction opposite that of its descent in said channel and into said tank.

CHARLES GILBERT HAWLEY.